CARTRIDGE LOCK AND RELEASE MECHANISM

Filed June 5, 1967

United States Patent Office 3,481,607

Patented Dec. 2, 1969

3,481,607

CARTRIDGE LOCK AND RELEASE MECHANISM

Carlton Gene Jenkins, Clarendon, Clayton Lewis Stoldt, North Warren, and Nikolaus A. Szeverenyi, Warren, Pa., assignors to Sylvania Electric Products Inc., a corporation of Delaware Filed June 5, 1967, Ser. No. 643,733

Int. Cl. G11b *5/78*

U.S. Cl. 274—4 12 Claims

ABSTRACT OF THE DISCLOSURE

A mechanism for orienting a cartridge containing an information carrying medium in an information handling device which has means therein for effecting movement of the medium. The mechanism comprises a pressured engagement member formed to engage, effect position, and provide pressured locking of the cartridge relative to the medium movement provision. Automatic release of the cartridge is initiated by drive means operating an unlocking member associated with the engagement member.

Background of the invention

This invention relates to means for effecting positive positioning and pressured retention of an object and more particularly to a mechanism having provisions for providing engagement, positioning, and pressured locking and released pressure unlocking and disengagement of an information containing cartridge oriented in an information handling device.

In a record and/or readout device for handling various types of flexible information media such as wire, film, and tape, it is conventional to employ cartridge type containers having therein a supply of the respective flexible medium. Since a major criterion for the proper functioning of the device is the maintenance of a constant rate of longitudinal movement of the medium, it is important that the cartridge containing the medium be positioned and held in a proper manner relative to the medium movement means to fully utilize the intent of that means. Various types of cartridge holding devices have been formed to facilitate cartridge orientation; for example, resilient catches, buttons, plungers, and the like. It has been found that many of these positioners afford only a degree of the desired placement. The inherent tolerances in cartridge fabrication when coupled with the restricted movement and limited influence of a number of the positioners results in a considerable amount of play or looseness between the respective positioner and the compatible cartridge holding arrangement. Such looseness often detracts from the operational efficiency of the medium movement means in effectively moving the particular information carrying medium at an optimum rate of travel. Another disadvantage of the resilient button-type positioner is the excessive force required to overcome the resiliency when inserting the cartridge into the device, likewise a similar counter force is needed for removal of the cartridge therefrom.

Objects and summary of the invention

It is an object of the invention to reduce the aforementioned disadvantages and to provide a cartridge orientation mechanism for use in an information handling device that has provisions for providing engagement positioning and positive locking of the cartridge relative to the flexible medium movement means of the device. Another object is to effect released pressure unlocking of the cartridge to provide for the easy insertion and removal of the cartridge from the device.

The foregoing objects are achieved in one aspect of the invention by utilizing a cartridge orientation mechanism in the form of pressured engagement means having provisions to provide predetermined engagement, positioning, and positive locking of the cartridge relative to the information medium movement means by pressured movement of the engagement means initiated by associated unlocking means. Release of the pressured locking of the cartridge is effected by a related movement of the engagement member initiated by an associated unlocking member operated by drive means in a predetermined manner. During insertion and removal, the engagement member is positionally removed from contact with the cartridge, thus the mechanism provides for facile insertion and removal of the cartridge.

Description of the preferred embodiment

Figures 1, 2, 3:
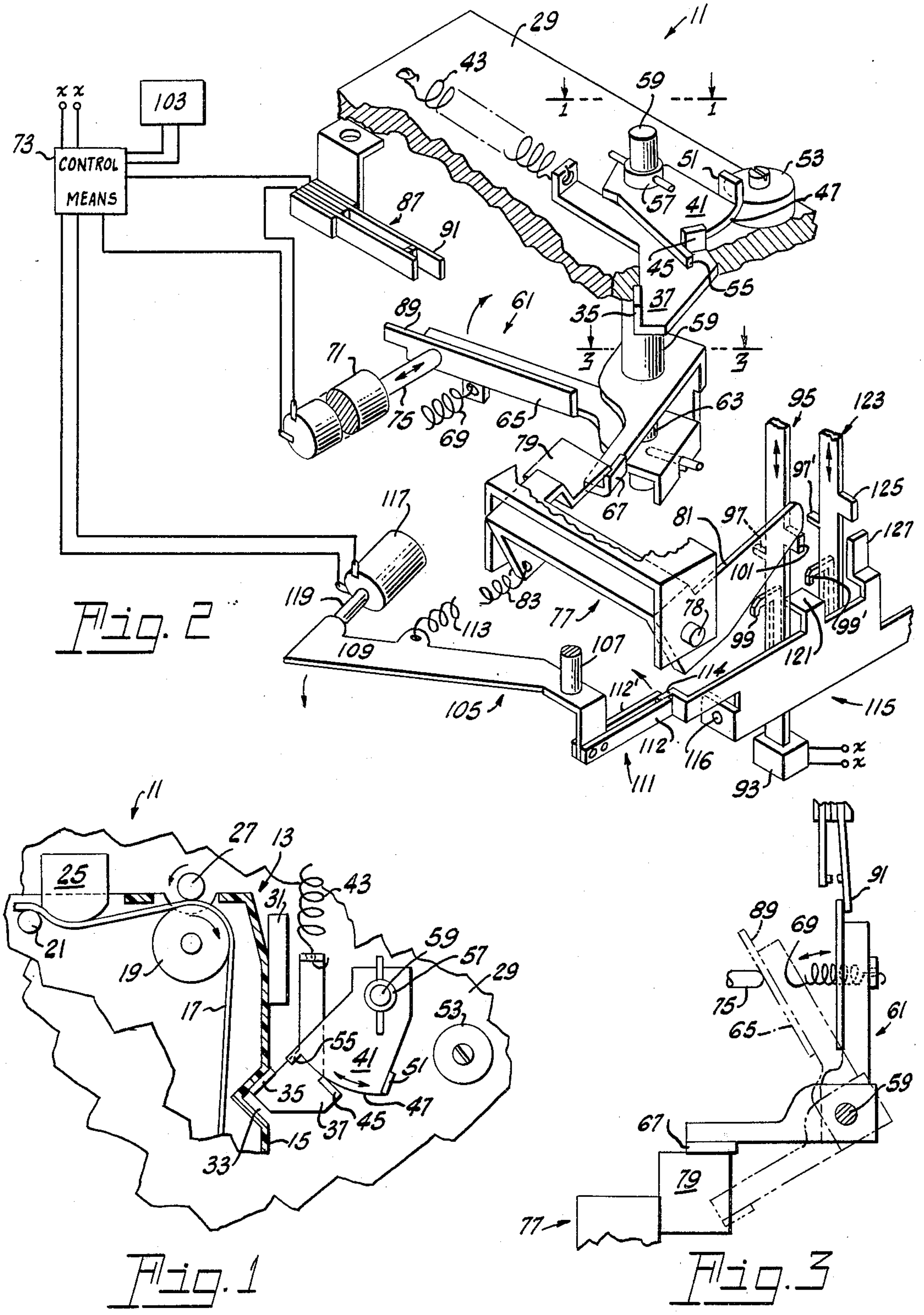
FIGURE 1 is a partial plan view showing the relationship of the positioning and locking means as engaged with the cartridge taken along the line 1—1 of FIGURE 2.
FIGURE 2 is a perspective illustrating the mechanical aspects of the invention.
FIGURE 3 is a fragmentary plan view taken along the line 3—3 of FIGURE 2.

For a better understanding of the present invention, together with other and further objects, advantages, and capabilities thereof, reference is made to the following specification and appended claims in connection with the aforedescribed drawing.

While the invention relates equally to a number of record and/or readout devices for handling a variety of information media; i.e., wire, film or tape, the described embodiment will refer to a tape handling device.

With reference to the drawing, there is shown in FIGURE 1 a partial plan view of the top portion of a tape handling device 11 showing a cut-away of a tape cartridge 13 locked into operational positioning. The cartridge is of conventional construction having a shell-like case 15 wherein is contained a supply of magnetic tape 17 which, in this instance, is conveyed over a resilient roller 19 and suitable guide means 21. The cartridge case has several openings therein, of which two are shown. Through one of these openings the sensing head 25 of the device makes contact with the tape, and through the other, the tape is brought into contact with means for moving the tape, which in this instance is the capstan 27 of the device.

Line-up of the cartridge 13 in the device is facilitated by a plurality of longitudinal guide means 31, one of which is shown, oriented so that wall portions of the cartridge make sliding contact therewith. The wall of the cartridge has suitable contact means, such as a recess 33, formed thereon to accommodate the engagement portion 35 of the cartridge engagement member 37 in a manner to make a positive seating thereagainst. The cartridge engagement member is formed as a free-floating pawl to cooperate in a sliding manner with an associated unlocking means in the form of a pivoted unlocking member 41 which provides movement thereto. Pawl pressure means 43, as shown in FIGURE 1, is for example a spring having one end affixed and the other attached to the engagement pawl 37. This tensions the pawl against the unlocking member and the cartridge recess in a direction susbtantially parallel with the movement of the cartridge positioning to effect positioning and pressured locking of the cartridge relative to the tape movement means. A pawl retention projection 45 has sliding cam follower relationship with the edge or cam surface 47 of the unlocking member 41. This, in conjunction with the force exerted by the pawl pressure means 43, enables the pawl engagement portion 35 to provide a positive and constant pressure to the cartridge, which in this instance pressures the resilient roller 19 and the tape thereover against the capstan 27 of the device in a manner to insure optimum and constant movement transfer from the capstan to the tape. It has been found that a pressure of approximately three to four pounds exerted by the cartridge roller against the capstan, with the tape therebetween, is appropriate to insure the desired movement transfer to the tape.

With reference to FIGURE 2, the cartridge engagement pawl 37 and the unlocking member 41 are in a cartridge release position. The unlocking member 41 is partially rotated from the position shown in FIGURE 1 whereby the impact provision 51 thereon makes contact with a movement restraining means or buffer provision 53. The stop provision 55 on the unlocking member 41 is in contact with the pawl retention projection 45 and as such causes a withdrawal movement to the pawl which retracts the pawl engagement from the cartridge 13 completely freeing the same and releasing the pressure between the resilient roller 19 and the capstan 27. The control system in the device is such that cartridge lock-in pressure is exerted on the cartridge 13 and the resilient roller 19 therein only during capstan 27 operation to avoid the formation of flat spot on the roller and resultant erratic movement of the tape.

To achieve the aforementioned operational lock-in positioning of the cartridge 13 in the device 11 as shown in FIGURE 1, the pivoted unlocking member 41 is partially rotated from the rest position illustrated in FIGURE 2, thereby shifting the engagement pawl 37 toward the cartridge. The engagement portion of the pawl makes contact with the cartridge contact means or recess 33 to consummate positioning and pressured locking whereupon movement of the pawl 37 is restrained. The unlocking member 41 continues in partial rotation thereby breaking the cooperation between the stop provision 55 thereon and the pawl retention projection 45 and allowing the pawl retention projection to slide on the cam surface 47 of the unlocking member 41. This provides free-floating action to the pawl 37, as at this stage of positioning there exists only sliding relationship with the unlocking member 41. Thus, there is no danger of the engagement pawl 37 exerting a destructive force on the cartridge 13 by excessive pressure exerted through direct mechanical linkage. Since the cartridge 13 is positionally held by pressured engagement means in a free-floating manner, it can, if desired, be forcefully pulled from the device without harming either the cartridge itself or the holding mechanism.

With reference to the activation of the aforedescribed positioning and locking mechanism, attention is directed to FIGURES 2 and 3 wherein drive means and linkages are shown.

The unlocking member 41 has a pivot point 57 affixed to a rotatable shaft 59. In this instance, the shaft extends beneath the base plate 29 whereat a locking control member 61 is fixed attached at a pivot point 63. This locking control member functions as a lever and comprises of an activation portion 65 and a radially oriented lock provision 67. Locking control member pressure means 69 is, for example, in the form of a spring to provide tensioning of the locking control member 41 in a cartridge unlock position.

Activation movement is supplied to the locking control member 41 in a manner counter to the tension thereof by an initial activation means 71, which is related through a control means 73 to other functions in the device. While the activation movement means 71 is shown as employing a plunger induced movement provision 75, such is not intended to be limiting as other movement means as, for example, a cam related action is equally applicable.

Associated with the locking control member 61 is an activation lock member 77 having a pivot point 78 in a plane substantially normal to the pivoting of the locking control member 61. The activation lock member 77 is formed to have a radially oriented planar provision 79 and a radially related release provision 81. Pressure loading is provided for example by pressure or tension means 83 to effect sliding engagement between the planar provision 79 and the lock provision 67 as the locking control member 61 moves in accordance with the initial motion applied thereto by the initial activation means 71. The planar provision is formed to move, by urging of the tension means 83, into locking engagement with the lock provision at the consummation of the initial movement of the locking control member 61 to hold the locking control member in a position whereby concomitantly the positioning and pressured locking of the tape cartridge 13 is effected as illustrated in FIGURES 1 and 3.

Means for controlling the energizing of the aforedescribed initial activation means 71 may be accomplished either directly or indirectly through related operational means, for example either by mechanical arrangement or by suitable switching means such as lock-out switch 87, which has a resilient contact member 91 operated by a switch actuation portion 89 of the locking control member 61 upon consummation of the initial motion thereof. Other types of operational or switching means and associated circuitry can also be utilized. When de-energized, the movement provision 75 of the activation means 71 is in a position to again provide another initial activation movement when so signalled by the control means 73.

Operationally, for the cartridge orientation mechanism to function from a rest position as shown in FIGURE 2 to the cartridge holding position of FIGURE 1, a number of interrelated movements take place. When it is desired that the device 11 be put into operation, a tape cartridge 13 is placed within the area defined by the cartridge guides 31. The governing switch 93 is then activated, as by depressing the "on-off" switch portion 95, which is held in a down or "on" position by the arm projection 97 locking under movable finger 99. Simultaneously, a stop 101 on the switch portion is disengaged from the release provision 81 of the activation lock member 77. This allows the pressure means 83 of the activation lock member 77 to bring the planar provision 79 thereof in pressured contact against the lock provision 67. Activation of the governing switch 93 institutes operation of the tape transport movement 103 and the control means 73 whereupon the initial activation means 71 is energized to provide the movement provision 75 thereof with motion. Contact of the moving movement provision 75 with the unlocking control member 61 imparts motion thereto which is counter to and in excess of the force exerted by the unlocking control member pressure 69 means thereby causing the lock provision 67 to move across the planar provision 79. When the lock provision 67 reaches the edge of the planar provision 79, the pressure-loading of the planar provision 79 causes it to move into a slide engagement relationship with the lock provision 67 and provides retention of the unlocking control member 61 at the consummation of its initial activation movement. At substantially the same time lock-out switch 87 is activated by an actuation portion 89 of the unlocking control member 61 to de-energize the initial activation means 71. The arcuate motion of the partial rotation of the unlocking control member 61 is transferred by the shaft 59 to impart similar motion to the associated pivoted unlocking member 41. This shifts the cartridge engagement pawl 37 into contact with the cartridge 13 effecting the operational positioning and locking shown in FIGURE 1.

Release of the cartridge locking mechanism is facilitated by a second depressing of the on-off portion 95 of governing switch 93 to release the arm projection 97 from the restraining movable finger 99. This release action allows the stop 101 to move upwardly, by resilient means not shown, to engage and raise the release provision 81 of the activation lock member 77 which is sufficient to overcome the pressure exerted by the activation lock member pressure means 83. Tilting of the pivoted activation lock member 77 disengages the unlocking control member 61 retention relationship between the planar provision 79 and the lock provision 67. This action permits the unlocking control member pressure means 69 to move that member out of lock positioning. The arcuate movement thereof is transferred to the associated unlocking member 41 to effect shifting of the cartridge engagement pawl 37 away from the cartridge 13. Thus, there is provided both release of the cartridge proper and relief of the pressure relative to the tape movement means.

Automatic release of cartridge positioning and locking along with tape movement pressure relief is initiated by signalling means associated with the tape or by operational features in the device. Whatever the means of initiation, automatic release is accomplished by movement of a pivoted shut-off member 105 which is formed to transfer motion to a switch trip member 115. This trip member is associated with the governing switch 93 and has a pivot point 116 in a plane differing from that of the shut-off member 105.

In greater detail, the shut-off member 105 is in the form of a lever movement having a pivot point 107 with a radially related movement receiving component 109 and a movement dispensing element 111, which is formed of two spaced apart resilient arms 112, 112' whereby motion is transferred from the plane of the shut-off member to the plane of the switch trip member 115. Upon signalling, the control means 73 initiates movement of a shut-off activation means 117 which, through a movement provision 119, imparts motion to the movement receiving component 109 of the shut-off member 105. This motion is counter to and of a force exceeding that imparted by a shut-off member pressure means 113 which normally effects positioning of the shut-off member 105 in an inactive position. The activation motion of the shut-off member 105 is transferred, by the movement dispensing element 111 thereof, to the lever contact means 114 of the pivoted switch trip member 15. Formed thereon is a trip means 121 which moves, by motion of the trip member 115, to push against movable finger 99 and cause release of the switch projection 97. This action allows the spring-loaded switch portion 95 to move upward and activate the release provision 81 which institutes the aforedescribed cooperating movements to effect release of the tape cartridge 13.

If desired, the automatic release provision can be inactivated by means of a continuous hold provision 123 which has thereon a trip member hold means 125 formed to make sliding engagement with a cooperating hold retention portion 127 on the switch trip member 115. When it is desired to inactivate the automatic release provision, the continuous hold provision 123 is depressed and held in a down position by arm projection 97' locking under movable finger 99'. This action brings the trip member hold means 125 into engagement with the cooperating hold retention portion 127 and prevents the inward shut-off motion of the switch trip member 115. When the continuous hold provision 123 is in operation, movement of the shut-off member 105, to effect automatic release, is absorbed by the resilient arms 112, 112' of the movement dispensing element 111.

Thus, an outstanding improvement in a tape cartridge orientation mechanism is provided that effects engagement, positioning, and positive locking of the cartridge relative to the tape movement means of the device. The pressure provided is nondestructive and is capable of being completely removed to permit easy insertion and removal of the cartridge from the device. Provisions for automatically releasing the cartridge are also provided.

While there has been shown and described what is at present considered the preferred embodiment of the invention, it will be obvious to those skilled in the art that various changes and modifications may be made therein without departing from the invention.

We claim:

1. In an information handling device having means for effecting movement of an information carrying medium, a cartridge orientation mechanism having provisions for providing cartridge positioning and substantially constant pressured locking and released pressure unlocking of a cartridge containing a supply of said information medium and having contact means formed on the case thereof, said mechanism comprising the combination of:

cartridge engagement means formed to move toward said cartridge and engage said cartridge contact means in a positive manner substantially free of moving contact with said cartridge, transfer said cartridge to an operating position and provide constant pressure positive locking of said cartridge in said operating position relative to said medium movement means;

pressume means formed to impart movement to said cartridge engagement means to consummate the engagement thereof with said cartridge contact means to effect the transfer of said cartridge to said operating position and provide positive locking of said cartridge thereat;

unlocking means formed to have sliding contact relationship with said cartridge engagement means, said unlocking means having a provision thereon to limit said sliding relationship in a manner to effect the release and withdrawal of said engagement means from said cartridge contact means by overcoming said constant locking pressure effected by said pressure means; and actuation means mechanically associated with and formed to provide predetermined movement to said unlocking means to enable said cartridge engagement means to move into engagement with said cartridge contact means and subseqently to effect the withdrawal of said cartridge engagement means from said cartridge contact means to facilitate the free removal of said cartridge from said information handling device.

2. A cartridge positioning and locking mechanism according to claim 1 wherein said unlocking means has related automatic release means associated with control means in said device to initiate movement to said unlocking means to effect the release of said positioning and pressured locking of said cartridge.

3. A cartridge positioning and locking mechanism according to claim 13 wherein said cartridge engagement means is constructed as an engagement pawl having a cartridge engagement portion and a retention provision formed thereon, and wherein said unlocking means is in the form of a pivoted unlocking member having a portion shaped to effect sliding association with said retention provision of said engagement pawl, said unlocking member having a stop provision formed thereon to cooperate with said pawl retention provision, and wherein said actuation means is mechanically related to said pivoted unlocking members to provide a partial rotational movement thereto.

4. A cartridge positioning and locking mechanism according to claim 3 wherein said shaped portion of said unlocking member is an edge portion formed as a cam surface adjacent said stop provision, and wherein said retention provision of said engagement pawl is formed as a retention projection to slide in cam follower relationship along said unlocking member cam surface after said cartridge is in locked position and said pivoted unlocking member is partially rotated in an overtravel manner in excess of effecting said locking of said pawl with said contact to thereby separate said pawl retention projection from said unlocking member stop provision.

5. A cartridge positioning and locking mechanism according to claim 4 wherein said pressure means is in the form of a resilient tension applied from a fixed point to said engagement pawl in a direction substantially parallel with the movement of said cartridge positioning to seat and maintain said pawl retention provision on said cam surface of said unlocking member.

6. In a tape handling device having means for effecting movement of the tape medium, a cartridge orientation mechanism having provisions for providing positioning and substantially constant pressured locking and released pressure unlocking and disengagement of a tape cartridge having contant means externally formed thereon, said mechanism comprising the combination of:

an engagement pawl formed to be predeterminately moved into engagement with said cartridge contact means to position, transfer and lock said cartridge in an operational position relative to said tape movement means, said pawl having a cartridge engagement portion and a retention provision formed thereon;

a pivoted unlocking member having a cam portion formed thereon to effect sliding association with said retention provision on said engagement pawl, said unlocking member having a stop provision located thereon relative to said cam portion to cooperate with said pawl retention provision;

pawl pressure means formed to provide cooperating sliding relationship between said engagement pawl and said unlocking member to effect pressured free-floating placement of said cartridge engagement portion with said cartridge contact means;

a pivoted locking control member formed to have mechanical association with said pivoted unlocking member;

a rotatable shaft having said unlocking member and said locking control member fixedly attached thereon to provide common movement transfer thereto;

locking control member pressure means attached to said control member to provide pressured positioning of said locking control member to orient said related unlocking member in a cartridge unlock position whereof said engagement pawl is withdrawn from engagement with said cartridge contact means;

initial activation means associated with said locking control member and having a movement provision formed to provide an initial predetermined directional motion to said locking control member counter to the pressure effected by said control member pressure means said motion being transferred to said unlocking member thereby initiating controlled movement of said pawl toward said cartridge to provide engagement therewith and effect the transfer of said cartridge to an operating position whereupon pressured locking of said cartridge is consummated;

means for controlling the energizing of said initial activation means;

means for controlling said positioning and locking of said cartridge whereof a substantially constant pressure is exerted relative to said tape movement means, said controlling means being associated with said locking control member; and means for effecting predetermined release of said positioning and unlocking of said cartridge and the relief of said pressure relative to said tape movement means said release means being related to the movement of said locking control member.

7. A cartridge positioning and locking mechanism according to claim 6 wherein said means for controlling the energizing of said initial activation means is accomplished through related operational means engaged by said locking control member upon consummation of the initial motion thereof to de-energize said initial activation means.

8. A cartridge positioning and locking mechanism according to claim 6 wherein said locking control member has a radially oriented lock provision and wherein means for controlling said pressured positioning and locking of said cartridge comprises: an activation lock member pivoted in a plane substantially normal to the pivoting of said locking control member; activation lock member pressure means associated with said activation lock member and formed to provide loading thereto relative to said lock provision; said activation lock member having a planar provision formed to facilitate the sliding engagement of said lock provision thereover as said locking control member moves in accordance with the initial motion applied thereto, said planar provision being formed to move into locking engagement with said lock provision at the consummation of said initial locking control member motion provided by said activation lock member pressure means to hold said locking control member thereat and concomitantly maintain said pressured positioning and locking of said cartridge.

9. A cartridge positioning and locking mechanism according to claim 8 wherein said activation lock member has a release provision formed thereon to provide release of said positioning and unlocking of said cartridge and the relief of said pressure relative to said tape movement means, and wherein a release provision motion means is provided to raise said release provision and effect disengagement of said lock provision and said planar provision of said activation lock member to allow pressure means movement of said locking control member and thereby indirectly disengage said engagement pawl from contact with said cartridge.

10. A cartridge positioning and locking mechanism according to claim 9 wherein means for automatically effecting the release of said positioning and unlocking of said cartridge and the relief of said pressure relative to said tape movement means comprises the combination of: a pivoted shut-off member formed to have a radially related movement receiving component and a movement dispensing element; a shut-off activation means having a movement provision therein formed to provide motion to said movement receiving component of said shut-off member; control means associated with said shut-off activation means to predeterminately initiate movement of said shut-off activation means; shut-off member pressure means formed to provide pressured positioning to said pivoted shut-off member in a direction counter to said motion supplied by said shut-off activation means; and switch trip member means pivoted and oriented relative to said shut-off member and having thereon contact means formed to engage said shut-off member movement dispensing element and provide motion transfer therebetween, and trip means shaped to initiate activation of motion for moving said release provision of said activation lock member to institute cooperating movements whereby the locking pressure of said engagement pawl with said cartridge is released whereupon said pawl is withdrawn from contact with said cartridge.

11. A cartridge positioning and locking mechanism according to claim 10 wherein means for inactivating said automatic release of said positioning and unlocking of said cartridge comprises: a movable trip member hold means oriented relative to said switch trip member; and a hold retention portion formed on said switch trip member in a manner to cooperate with said trip member hold means to substantially prevent movement of said trip member.

12. A cartridge positioning and locking mechanism according to claim 6 wherein said means for controlling and energizing of said initial activation means is initiated during the operation of said tape movement means.

References Cited

UNITED STATES PATENTS 3,350,025 10/1967 Lear -------------- 242—55.19

LEONARD FORMAN, Primary Examiner

U.S. Cl. X.R.

179—100.2; 212—55.13

PO-1050
(5/69)

UNITED STATES PATENT OFFICE
CERTIFICATE OF CORRECTION

Patent No. 3,481,607 Dated December 2, 1969

Inventor(s) Carlton G. Jenkins, Clayton L. Stoldt, & Nikolaus A. Szeverenyi

It is certified that error appears in the above-identified patent and that said Letters Patent are hereby corrected as shown below:

CLAIM 3
Column 6, Line 71, "13" should read ---1---.

Column 7, Line 5, "members" should read ---member---

Column 7, Line 32, "contant" should read ---contact---

SIGNED AND
SEALED
APR 28 1970

(SEAL)
Attest:

Edward M. Fletcher, Jr.
Attesting Officer

WILLIAM E. SCHUYLER, JR.
Commissioner of Patents